United States Patent
Takahashi et al.

(10) Patent No.: US 10,513,990 B2
(45) Date of Patent: Dec. 24, 2019

(54) ENGINE CONTROL DEVICE

(71) Applicant: MAZDA MOTOR CORPORATION, Hiroshima (JP)

(72) Inventors: Toshiaki Takahashi, Hiroshima (JP); Masanari Sueoka, Hiroshima (JP); Masatoshi Hidaka, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 25 days.

(21) Appl. No.: 15/759,256

(22) PCT Filed: Mar. 9, 2017

(86) PCT No.: PCT/JP2017/009580
§ 371 (c)(1),
(2) Date: Mar. 12, 2018

(87) PCT Pub. No.: WO2017/169640
PCT Pub. Date: Oct. 5, 2017

(65) Prior Publication Data
US 2018/0252169 A1  Sep. 6, 2018

(30) Foreign Application Priority Data
Mar. 31, 2016  (JP) ................. 2016-073249

(51) Int. Cl.
*F02D 13/02* (2006.01)
*F01L 1/344* (2006.01)
(Continued)

(52) U.S. Cl.
CPC .......... *F02D 13/0207* (2013.01); *F01L 1/344* (2013.01); *F01L 9/04* (2013.01);
(Continued)

(58) Field of Classification Search
CPC . F02D 13/02; F01N 3/20; F02B 23/10; F02M 25/08
(Continued)

(56) References Cited

U.S. PATENT DOCUMENTS 6,968,825 B2 * 11/2005 Hitomi ............... F01L 1/053
123/406.11
7,182,050 B2 * 2/2007 Hitomi ............... F01L 1/185
123/58.8
(Continued)

FOREIGN PATENT DOCUMENTS

JP  2002-285898 A  10/2002
JP  2005-016343 A  1/2005
(Continued)

OTHER PUBLICATIONS

International Search Report issued in PCT/JP2017/009580; dated May 30, 2017.

*Primary Examiner* — John Kwon
*Assistant Examiner* — Johnny H Hoang
(74) *Attorney, Agent, or Firm* — Studebaker & Brackett PC

(57) ABSTRACT

A PCM (100) selects one of a CI mode or an SI mode based on the operating conditions of the engine (1). In the CI mode, the engine (1) is operated by compression ignition combustion. In the SI mode, the engine (1) is operated by spark ignition combustion. if, while the engine (1) is being operated in the CI mode, a determination is made that an estimated value (Tc) of the catalyst temperature is lower than or equal to a warming start temperature (Ts), the PCM (100) further performs first warming control to assign four cylinders (18) as CI and SI cylinders, which perform the compression ignition combustion and the spark ignition combustion, respectively, such that the four cylinders (18) alternately perform the compression ignition combustion
(Continued)

and the spark ignition combustion in accordance with the order of combustion of the cylinders.

10 Claims, 8 Drawing Sheets

(51) Int. Cl.
F01L 9/04 (2006.01)
F02D 41/14 (2006.01)
F02D 45/00 (2006.01)
F01N 3/20 (2006.01)
F02B 23/10 (2006.01)
F02M 25/08 (2006.01)
F02P 5/15 (2006.01)

(52) U.S. Cl.
CPC ......... F02D 41/1441 (2013.01); F02D 45/00 (2013.01); F01N 3/2053 (2013.01); F02B 23/105 (2013.01); F02M 25/0854 (2013.01); F02P 5/1502 (2013.01)

(58) Field of Classification Search
USPC .............................. 123/406.47; 701/102–105
See application file for complete search history.

(56) References Cited

U.S. PATENT DOCUMENTS

| | | | | |
|---|---|---|---|---|
| 2001/0017123 | A1* | 8/2001 | Raab | F02B 1/12 |
| | | | | 123/305 |
| 2002/0139346 | A1 | 10/2002 | Aoyama et al. | |
| 2006/0201143 | A1* | 9/2006 | Jacobsson | F02D 41/0275 |
| | | | | 60/295 |
| 2012/0216776 | A1* | 8/2012 | Nagatsu | F02B 23/101 |
| | | | | 123/305 |
| 2015/0226143 | A1* | 8/2015 | Iwai | F02B 23/101 |
| | | | | 123/294 |
| 2015/0240706 | A1* | 8/2015 | Yamagata | F02D 21/08 |
| | | | | 60/603 |
| 2016/0252031 | A1* | 9/2016 | Nagatsu | F02D 41/0057 |
| | | | | 123/305 |

FOREIGN PATENT DOCUMENTS

| | | |
|---|---|---|
| JP | 2006-002683 A | 1/2006 |
| JP | 2009-085036 A | 4/2009 |
| JP | 2009-085174 A | 4/2009 |
| JP | 2012-241542 A | 12/2012 |

* cited by examiner

COMBUSTION ORDER: #1→#3→#4→#2

ENGINE CONTROL DEVICE

TECHNICAL FIELD

The present disclosure relates to an engine control device.

BACKGROUND ART

For example, Patent Document 1 shows that a multi-cylinder gasoline engine selects one of a spark ignition (SI) combustion mode or a compression ignition (CI) combustion mode, depending on the engine operating range. In the SI combustion mode, an air-fuel mixture in each of cylinders is combusted by spark ignition. In the CI combustion mode, an air-fuel mixture is combusted by autoignition. While the engine is in a predetermined low-load operating range, the engine operates in the relatively highly thermal efficient and highly fuel efficient CI combustion mode. On the other hand, while the engine is in a higher-load operating range, and is operating in the CI combustion mode, combustion noise grows. Thus, the engine operates in the SI combustion mode so as to be able to reduce such combustion noise in this range.

CITATION LIST

Patent Document

[Patent Document 1] Japanese Unexamined Patent Publication No. 2009-85174

SUMMARY

Technical Problem

In the CI combustion mode, the thermal efficiency is higher than in the SI combustion mode. Accordingly, exhaust gas having a relatively low temperature is discharged. Thus, the engine disclosed in Patent Document 1 described above is unsuitable for keeping a catalyst active. This is because the CI combustion mode continuing in a low-load range may result in a decrease in catalyst temperature.

To address this problem, if the catalyst temperature decreases in the low-load range, changing the combustion mode from the CI combustion mode to the SI combustion mode and retarding the timing at which spark ignition is performed may allow high-temperature exhaust gas to be sent to the catalyst. However, such a configuration decreases the thermal efficiency of the engine by the increment of the exhaust gas temperature, and is thus unsuitable for improving fuel efficiency.

In view of the foregoing background, it is therefore an object of the present disclosure to keep a catalyst active, and achieve high fuel efficiency, in an engine control device which can select one of a spark ignition combustion mode or a compression ignition combustion mode.

Solution to the Problem

The present disclosure relates to an engine control device. This device includes: an engine body including a plurality of cylinders; fuel injection valves configured to supply fuel separately into the individual cylinders; spark plugs attached to the cylinders, respectively, to each ignite an air-fuel mixture in an associated one of the cylinders; a catalyst connected through an exhaust passage to the cylinders and functioning to purify exhaust gas discharged from each cylinder; and a controller configured to control the fuel injection valves and the spark plugs to operate the engine body.

The controller selects one of a first mode in which the engine body is operated by compression ignition combustion to autoignite the air-fuel mixture in the cylinders, or a second mode in which the engine body is operated by spark ignition combustion with the air-fuel mixture in the cylinders ignited, and if, while the engine body is being operated in the first mode, a determination is made that a temperature of the catalyst is lower than or equal to a predetermined temperature, the controller performs warming control to assign the cylinders as CI and SI cylinders, which perform the compression ignition combustion and the spark ignition combustion, respectively, such that the cylinders alternately perform the compression ignition combustion and the spark ignition combustion in accordance with the order of combustion of the cylinders.

According to this configuration, the controller performs warming control to assign the cylinders as CI and SI cylinders in accordance with the order of combustion of the cylinders. Thus, the compression ignition combustion and the spark ignition combustion are alternately performed on a cylinder-by-cylinder basis.

Since, in the spark ignition combustion, exhaust gas has a relatively high temperature, exhaust gas discharged from the SI cylinder(s) can warm the catalyst. On the other hand, since, in the compression ignition combustion, the thermal efficiency is relatively high as described above, assigning one or more of the cylinders as a CI cylinder or CI cylinders can reduce the degree to which the thermal efficiency of the entire engine decreases and, in turn, the degree to which the fuel efficiency decreases.

As can be seen, the configuration described above can reduce the degree to which the thermal efficiency of the entire engine decreases while warming the catalyst. This allows the catalyst to be kept active, and can provide high fuel efficiency.

Under the warming control, the controller may set an air-fuel ratio of the air-fuel mixture in the SI cylinder to be richer than a theoretical air-fuel ratio while setting an air-fuel ratio of the air-fuel mixture in the CI cylinder to be leaner than the theoretical air-fuel ratio.

According to this configuration, the rich air-fuel mixture is combusted in each SI cylinder. Thus, exhaust gas supplied from the SI cylinder contains a relatively large amount of nitrogen oxide. For this reason, when the exhaust gas supplied from the SI cylinder reaches the catalyst, nitrogen oxide is relatively frequently reduced in the catalyst. In other words, oxygen is relatively frequently occluded in the catalyst. Meanwhile, the lean air-fuel mixture is combusted in each CI cylinder. Thus, exhaust gas supplied from the CI cylinder contains a relatively large amount of reducing components such as HC, CO, and soot. For this reason, when the exhaust gas supplied from the CI cylinder reaches the catalyst, the reducing components are relatively frequently oxidized in the catalyst. In other words, oxygen is relatively frequently released from the catalyst. The heat of reaction generated by oxidation of substances such as HC and CO can warm the catalyst.

The cylinders are alternately assigned as CI and SI cylinders in accordance with the order of combustion of the cylinders. As a result, the catalyst repeatedly undergoes a reduction reaction and an oxidation reaction on a cylinder-by-cylinder basis. The resultant heat of reaction allows the catalyst to be rapidly warmed.

The catalyst may be configured as a three-way catalyst having three-way purification capability. Under the warming control, the controller may set a difference between the air-fuel ratio of the air-fuel mixture in the SI cylinder and the theoretical air-fuel ratio to be equal to a difference between the air-fuel ratio of the air-fuel mixture in the CI cylinder and the theoretical air-fuel ratio.

According to this configuration, even if the air-fuel ratio in each cylinder is set to be rich or lean, the total air-fuel ratio in the cylinders can be close to the theoretical air-fuel ratio. That is to say, although exhaust gas discharged from each cylinder contains a relatively large amount of $NO_x$ or reducing components, exhaust gas discharged from the cylinders can totally contain $NO_x$ and reducing components in a balanced manner. Thus, the catalyst can effectively demonstrate its three-way purification capability while repeatedly undergoing the reduction reaction and oxidation reaction described above.

The engine control device may further include: inlets which communicate with the cylinders, respectively, and through each of which air is sucked from an intake passage common to the cylinders into an associated one of the cylinders; intake valves each capable of opening and closing an associated one of the inlets; a throttle valve provided in the intake passage to adjust a flow rate of gas to be supplied into the cylinders; and intake valve drive mechanisms configured to individually control opening times of the intake valves on a cylinder-by-cylinder basis. Under the warming control, the controller may fully open the throttle valve, and may control the intake valves of the cylinders via the intake valve drive mechanisms to allow an amount of air to be sucked into the SI cylinder to be lower than an amount of air to be sucked into the CI cylinder.

If the spark ignition combustion is performed, there arises the need to appropriately regulate the amount of air to be sucked into the cylinders in accordance with the output required of the engine and other factors to provide high combustion stability. On the other hand, if the compression ignition combustion is performed, combustion is stably performed in spite of the lean air-fuel ratio of the air-fuel mixture. Thus, there is little need to regulate the amount of air to be sucked into the cylinders.

According to the configuration described above, while the warming control is being performed, the controller fully opens the throttle valve. This allows as large an amount of air as possible to be sucked into the CI cylinders, in which the compression ignition combustion is performed. This improves the thermal efficiency. The controller adjusts the opening and closing times, lifts, and other parameters of the intake valves via the intake valve drive mechanisms to adjust the amount of air to be sucked into the SI cylinder. Thus, even if the throttle valve is fully open, the amount of air to be sucked into the SI cylinder can be regulated, and in turn, the spark ignition combustion can be stably performed in the SI cylinder.

As can be seen, the configuration described above is effective at performing both compression ignition combustion in the CI cylinder(s) and spark ignition combustion in the SI cylinder(s).

In addition, according to the configuration described above, the controller controls the intake valves to reduce the amount of air to be sucked into the SI cylinder. This configuration allows the air-fuel ratio of the air-fuel mixture in each SI cylinder to be set to be richer than the theoretical air-fuel ratio. In this case, the pumping loss does not increase.

The intake valve drive mechanisms may be configured to be able to individually change at least opening and closing times of the intake valves on a cylinder-by-cylinder basis, and under the warming control, the controller may match the closing times of the intake valves of the SI and CI cylinders to each other, and may adjust the opening time of the intake valve of the SI cylinder, via an associated one of the intake valve drive mechanisms, to reduce the amount of air to be sucked into the SI cylinder.

According to this configuration, the controller changes the opening time of an associated one of the intake valves to reduce the amount of air to be sucked into the SI cylinder. Unlike a situation where the closing time of the intake valve is changed, this configuration helps prevent the effective compression ratio of the piston from decreasing and, in turn, maintain high thermal efficiency.

The engine control device may further include: exhaust valves each capable of opening and closing an associated one of outlets through each of which gas is discharged from inside of an associated one of the cylinders to the exhaust passage; and exhaust valve drive mechanisms configured to individually control opening and closing of the exhaust valves on a cylinder-by-cylinder basis. The exhaust valve drive mechanisms may be configured to be able to open and close the exhaust valves such that subsequent to a main valve opening operation performed during an exhaust stroke, a subsequent valve opening operation is performed to allow the exhaust valves to be open during an intake stroke. Under the warming control, the controller may control the exhaust valves via the exhaust valve drive mechanisms to allow the main valve opening operation and the subsequent valve opening operation to be performed for the exhaust valve of the CI cylinder.

According to this configuration, the exhaust valve drive mechanisms perform a subsequent valve opening operation, thus allowing the controller to again introduce part of the exhaust gas discharged from the exhaust ports into the cylinders, i.e., to perform internal EGR. This helps increase the internal temperature of each CI cylinder and stabilize compression ignition combustion.

As described above, in the spark ignition combustion, the exhaust gas has a relatively high temperature. Thus, the internal temperature of each SI cylinder tends to be higher than that of each CI cylinder.

According to the configuration described above, performing internal EGR allows the internal temperature of the CI cylinder to be kept higher in accordance with the amount of the exhaust gas again introduced. This can reduce the difference in temperature between the SI cylinder and the CI cylinder. This helps maintain uniform thermal deformation of the engine body to improve the reliability of the engine body. In addition, reducing the difference in temperature between the cylinders helps stabilize compression ignition combustion when the combustion mode of the engine returns to the compression ignition combustion mode after completion of the warming control.

If an identical cylinder has been assigned as the SI or CI cylinder for a predetermined period of time by the warming control, the controller may change at least one of the cylinders that has been assigned as the SI cylinder to the CI cylinder while changing the other cylinder that has been assigned as the CI cylinder to the SI cylinder.

According to the configuration described above, if, under the warming control, an identical cylinder has been assigned as the SI or CI cylinder for a predetermined or longer period of time, the controller changes the cylinder from the SI cylinder to the CI cylinder or vice versa. Thus, while the internal temperature of the cylinder changed from the SI cylinder to the CI cylinder can be reduced, the internal temperature of the cylinder changed from the CI cylinder to the SI cylinder can be increased. This helps reduce the difference in temperature between the cylinders, and in turn, maintain uniform thermal deformation of the engine body to improve the reliability of the engine body. In addition, reducing the difference in temperature between the cylinders helps stabilize compression ignition combustion when the combustion mode of the engine returns to the compression ignition combustion mode after completion of the warming control.

Under the warming control, the controller may allow a timing at which the air-fuel mixture in the SI cylinder is ignited to be later than a timing at which an associated piston arrives at a compression top dead center.

According to the configuration described above, the controller retards the timing at which the air-fuel mixture is ignited to lower the thermal efficiency of the SI cylinder. Accordingly, the temperature of the exhaust gas can be drastically increased. This allows the catalyst to be rapidly warmed.

The engine control device may further include: a purge system configured to introduce evaporated fuel in a fuel tank into the cylinders. The controller may perform the warming control such that the purge system supplies purge gas to the cylinders.

Evaporated fuel and air are mixed together in advance to obtain the purge gas. Supplying the purge gas can increase the combustibility of the air-fuel mixture in the CI cylinder. This helps reduce unburned fuel in each CI cylinder even while the internal temperatures of the cylinders are relatively low, such as while the warming control is being performed.

Supplying the purge gas allows the air-fuel ratio of the air-fuel mixture in the SI cylinder to be set to be rich. This helps keep the catalyst active and allow the catalyst to effectively provide purification performance, as described above.

The controller may perform the warming control such that a torque obtained by the spark ignition combustion in the SI cylinder is equal to a torque obtained by the compression ignition combustion in the CI cylinder.

This configuration allows the controller to reduce the degree to which the torque varies.

Advantages of the Invention

As can be seen from the foregoing description, according to the engine control device, compression ignition combustion and spark ignition combustion are alternately performed on a cylinder-by-cylinder basis, thereby keeping a catalyst active and achieving high fuel efficiency.

DESCRIPTION OF EMBODIMENTS

Embodiments of an engine control device will now be described with reference to the drawings. The following description of preferred embodiments is only an example.

<Overall Configuration for Engine>

Figure 1:
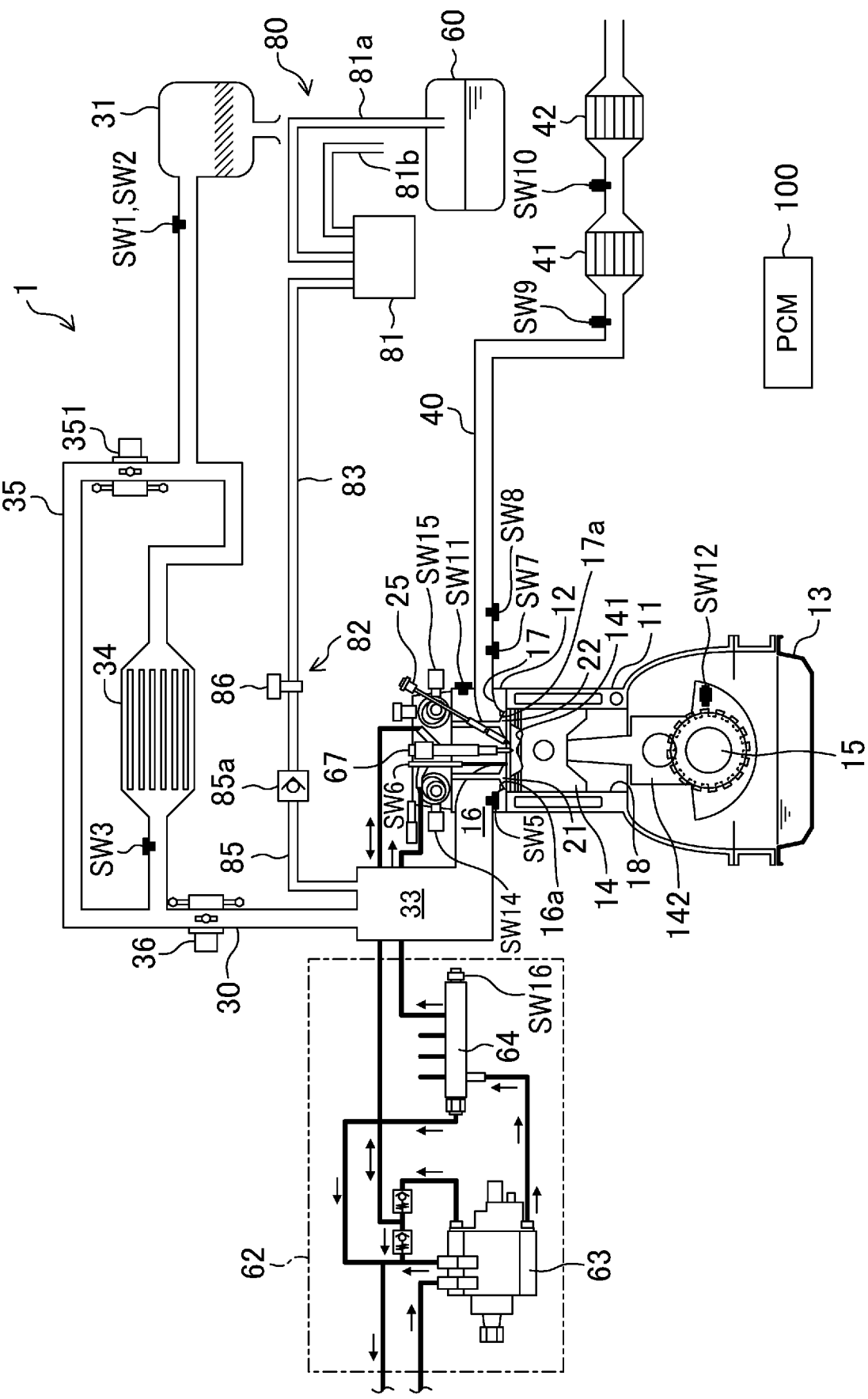
FIG. 1 shows a general configuration for an engine.
Figure 2:
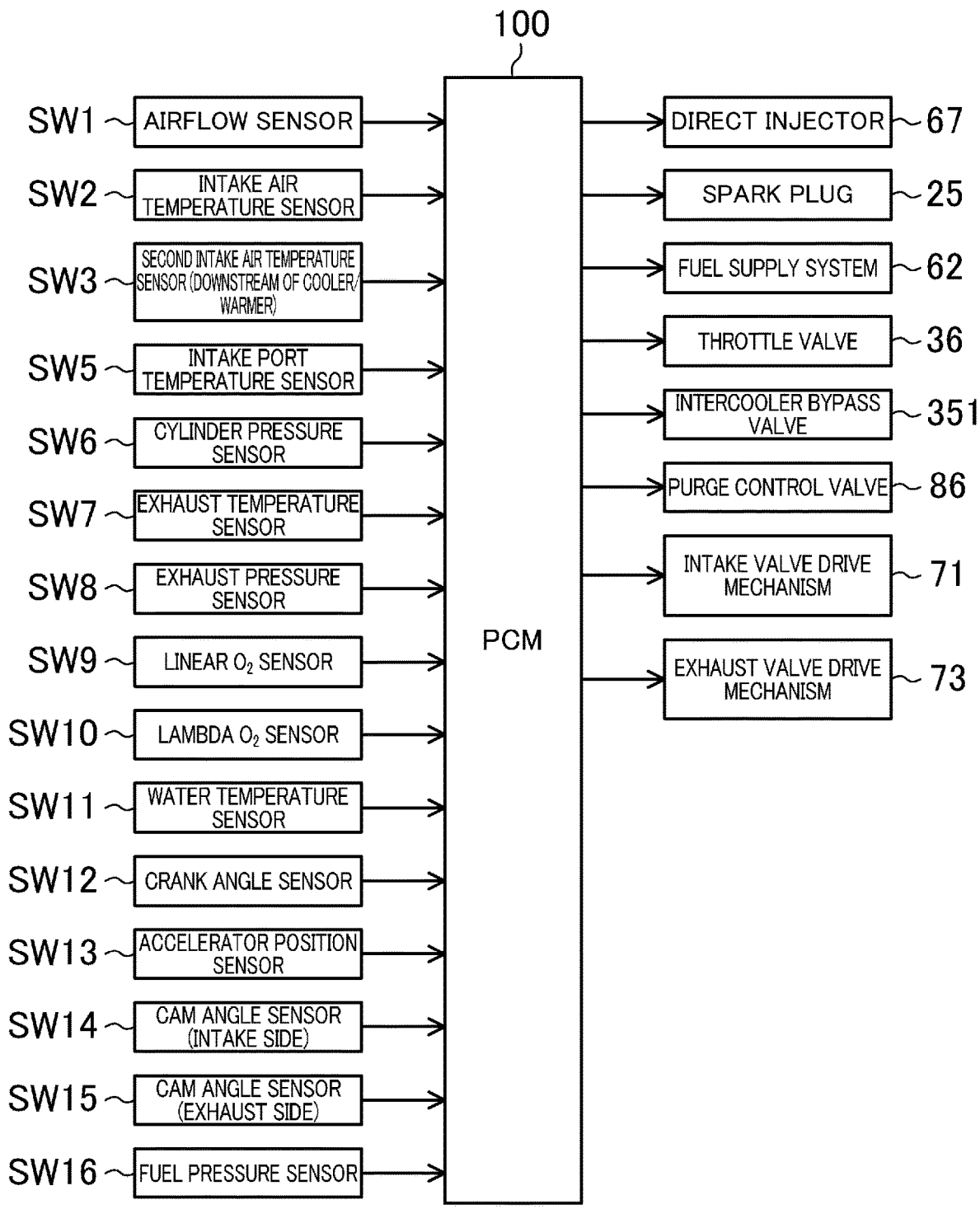
FIG. 2 is a block diagram relating to control of an engine.
Figure 3:
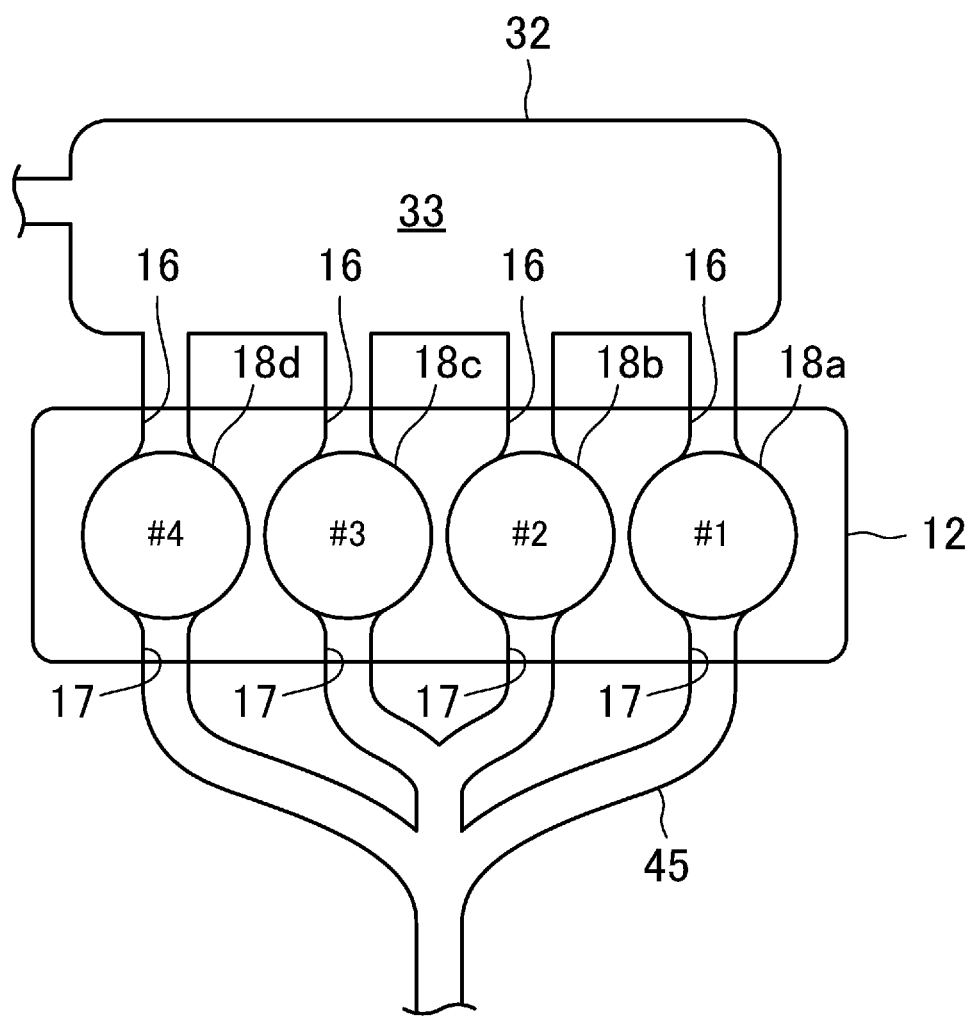
FIG. 3 explains the combustion order of first through fourth cylinders.

FIGS. 1 and 2 show a general configuration for an engine (engine body) 1 including an engine control device according to an embodiment. This engine 1 is installed in a vehicle, and is a gasoline engine to be supplied with fuel containing at least gasoline. The engine 1 includes a cylinder block 11 including a plurality of cylinders 18, a cylinder head 12 disposed over the cylinder block 11, and an oil pan 13 disposed below the cylinder block 11 to store lubricating oil. Note that although only one of the cylinders is shown in FIG. 1, the engine 1 according to this embodiment is a four-stroke, four-cylinder engine including four cylinders 18 arranged in series as shown in FIG. 3. A piston 14, which is coupled to a crankshaft 15 via a connecting rod 142, is reciprocatably fitted into each of the cylinders 18. An upper surface of the piston 14 has a cavity 141 having a shape such as that of a re-entrant cavity of a diesel engine. The cavity 141 faces an associated one of injectors 67, described below, when the piston 14 is positioned near its compression top dead center. The cylinder head 12, each of the cylinders 18, and the associated piston 14 having the cavity 141 define a combustion chamber. Note that the shape of the combustion chamber should not be limited to the shape shown. For example, the shape of the cavity 141, the shape of the upper surface of the piston 14, and the shape of the ceiling of the combustion chamber may be modified as appropriate.

The gasoline engine 1 is set to have a relatively high geometric compression ratio of 15 or more in order to improve the theoretical thermal efficiency and stabilize compression ignition combustion described below and for other purposes. Note that the geometric compression ratio merely needs to be set within a range approximately from 15 to 20 as appropriate, and may be, for example, 18.

The cylinder block 11 includes the four cylinders 18 arranged in series as described above. FIG. 3 explains the combustion order of the cylinders 18 according to this embodiment. The four cylinders 18 shown in FIG. 3 may be referred to as the first cylinder (#1) 18a, the second cylinder (#2) 18b, the third cylinder (#3) 18c, and the fourth cylinder (#4) 18d, which are arranged in this order from the right side of the paper along a direction in which the cylinders 18 are arranged. In this embodiment, if the cylinders 18 each move through one stroke, an air-fuel mixture in the first cylinder 18a, an air-fuel mixture in the third cylinder 18c, an air-fuel mixture in the fourth cylinder 18d, and an air-fuel mixture in the second cylinder 18b are configured to be combusted in this order.

The cylinder head 12 has intake ports 16, which are each provided for an associated one of the cylinders 18, and are each provided with an intake valve 21 that is capable of opening and closing an opening (an inlet 16a) of the intake port 16 near the associated combustion chamber. The inlets 16a communicate with the first, second, third, and fourth cylinders 18a, 18b, 18c, and 18d, respectively. Air is sucked from an intake passage 30 common to the first through fourth cylinders 18a-18d through the inlets 16a into the cylinders 18. Likewise, the cylinder head 12 has exhaust ports 17, which are each provided for an associated one of the cylinders 18, and are each provided with an exhaust valve 22 that is capable of opening and closing an opening (an outlet 17a) of the exhaust port 17 near the associated combustion chamber.

Out of valve systems that respectively drive the intake valves 21 and the exhaust valves 22, the intake valve system includes intake valve drive mechanisms 71 configured to individually control the opening and closing of the intake valves 21 on a cylinder-by-cylinder basis, as shown in FIG. 2. The intake valve drive mechanisms 71 are each provided on an associated one of the intake valves 21 for the cylinders 18. In this embodiment, hydraulic variable valve mechanisms are used as the intake valve drive mechanisms 71. Although not shown in detail, the intake valve drive mechanisms 71 are configured to be capable of altering the opening and closing times of the intake valves 21 and in turn, the opening periods of the intake valves 21 on a cylinder-18-by-cylinder-18 basis. Note that to configure such an intake valve drive mechanism 71, an electromagnetic valve system that drives the intake valves 21 with an electromagnetic actuator may be used. The intake valve drive mechanism 71 may be configured in combination with a so-called variable valve timing (VVT) system. In this case, a hydraulic system, an electromagnetic system, or any other suitable system may be appropriately used as the VVT system.

While the intake valve system includes the intake valve drive mechanisms 71, the exhaust valve system includes exhaust valve drive mechanisms 73 configured to individually control the opening and closing of the exhaust valves 22 on a cylinder-by-cylinder basis, as shown in FIG. 2. The exhaust valve drive mechanisms 73 are each provided on an associated one of the exhaust valves 22 for the cylinders 18. Just like the intake valve drive mechanisms 71, hydraulic variable valve mechanisms are used as the exhaust valve drive mechanisms 73. The exhaust valve drive mechanisms 73 each alter the opening and closing times and lift of an associated one of the exhaust valves 22. Note that to configure such an exhaust valve drive mechanism 73, an electromagnetic valve system may be used just like the intake valve drive mechanism 71, or each exhaust valve drive mechanism 73 may be configured in combination with a VVT system.

Each exhaust valve drive mechanism 73 is configured to be capable of opening and closing an associated one of the exhaust valves 22 such that subsequent to a main valve opening operation performed during an exhaust stroke of the engine 1, the subsequent valve opening operation is performed to allow the valve to be open for a certain period of time also during an intake stroke. Specifically, the exhaust valve drive mechanism 73 is configured to be able to switch the operating mode of the exhaust valve 22 between a normal mode and a special mode. In the normal and special modes, cam profiles are different from each other. One of the normal or special mode is selected in accordance with the operating conditions of the engine 1. In the normal mode, only the main valve opening operation is performed. That is to say, in the normal mode, the exhaust valve 22 opens only once during the exhaust stroke (see FIG. 10A). On the other hand, in the special mode, the main valve opening operation and the above-mentioned subsequent valve opening operation are performed. That is to say, in the special mode, the exhaust valve 22 opens twice during the exhaust stroke and during an intake stroke (see FIG. 10B). The special mode is utilized in controlling internal EGR.

The injectors (fuel injection valves) 67 are attached to the cylinder head 12 to directly inject fuel into the cylinders 18, respectively. The injectors 67 are configured to supply fuel separately to the first through fourth cylinders 18a-18d. Specifically, the injectors 67 each have nozzles extending from a central portion of the ceiling surface of an associated one of the combustion chambers toward the interior of the associated combustion chamber. The injectors 67 each directly inject, into the associated combustion chamber, fuel in an amount determined by the operating conditions of the engine 1 and at the timing set in accordance with the operating conditions of the engine 1. In this example, each of the injectors 67 is a multi-hole injector having a plurality of nozzles, although not shown in detail. This structure allows the injector 67 to inject the fuel to radially spread fuel spray from a central portion of the associated combustion chamber. Note that the injector 67 should not be limited to the multi-hole injector, but may be an outwardly opening injector.

A fuel tank 60 and the injectors 67 are coupled together through a fuel supply path (not shown). A fuel supply system 62 is provided somewhere along the fuel supply path. The fuel supply system 62 includes a fuel pump 63 and a common rail 64, and is capable of supplying fuel to the injectors 67 at a relatively high fuel pressure. The fuel pump 63 pumps fuel from the fuel tank 60 to the common rail 64. The common rail 64 is capable of storing the pumped fuel at a relatively high fuel pressure. The injectors 67 open to inject the fuel stored in the common rail 64 through the nozzles of the injectors 67. In this embodiment, although not shown, the fuel pump 63 is a plunger pump, which is driven by the engine 1. The fuel supply system 62 including the engine-driven pump allows fuel to be supplied to the injectors 67 at a fuel pressure of higher than or equal to 30 MPa. The fuel pressure may be set to be about 120 MPa at the maximum. The pressure of the fuel supplied to the injectors 67 is changed in accordance with the operating conditions of the engine 1. Note that the fuel supply system 62 should not be limited to this configuration.

Spark plugs 25 for forcibly igniting an air-fuel mixture in the respective combustion chambers are also attached to the cylinder head 12. Specifically, the spark plugs 25 are attached to the first through fourth cylinders 18a-18d, respectively, to each ignite an air-fuel mixture in an associated one of the first through fourth cylinders 18a-18d. In this example, each spark plug 25 penetrates the cylinder head 12 to extend obliquely downward from the exhaust side of the engine 1. A tip of the spark plug 25 is disposed to face the interior of the cavity 141 of the piston 14 located at the compression top dead center.

As shown in FIG. 1, the intake passage 30 is connected to one side surface of the engine 1 to communicate with the intake ports 16 of the cylinders 18. On the other hand, an exhaust passage 40 is connected to the other side surface of the engine 1 to discharge burned gas (exhaust gas) from the combustion chambers of the cylinders 18.

An upstream end portion of the intake passage 30 is provided with an air cleaner 31 through which intake air is passed. A downstream portion of the intake passage 30 is configured as an intake manifold 32, which includes a surge tank 33 temporarily storing air to be supplied into the cylinders 18, and independent passages branching from the surge tank 33 into the respective cylinders 18. The downstream ends of the independent passages of the intake manifold 32 are connected to the intake ports 16 of the cylinders 18, respectively.

An intercooler/warmer 34 and a throttle valve 36 are disposed in the intake air passage 30 between the air cleaner 31 and the surge tank 33. The intercooler/warmer 34 is a water-cooling cooler that cools or heats the air. The throttle valve 36 regulates the amount of the intake air to be supplied to each of the cylinders 18. The throttle valve 36 opens and closes under a control signal from a powertrain control module (PCM) 100 to regulate the amount of intake air passing through the intake passage 30 and in turn, the flow rate of intake air (gas) to be supplied through the intake manifold 32 to each of the cylinders 18.

The intake passage 30 is also connected to an intercooler bypass passage 35 bypassing the intercooler/warmer 34. This intercooler bypass passage 35 is provided with an intercooler bypass valve 351 for adjusting the flow rate of the air passing through the passage 35. The opening degree of the intercooler bypass valve 351 is adjusted to adjust the ratio of the flow rate of the air through the intercooler bypass passage 35 to the flow rate of the air through the intercooler/warmer 34. This makes it possible to adjust the temperature of fresh air to be introduced into the cylinder 18. Note that the intercooler/warmer 34 and its associated members may be omitted.

An upstream portion of the exhaust passage 40 is configured as an exhaust manifold 45, which includes independent passages branching into the respective cylinders 18 and connected to the outer ends of the respective exhaust ports 17, and a collecting portion in which the independent passages collect. A portion of the exhaust passage 40 downstream of the exhaust manifold 45 is connected to a direct catalyst 41 and an underfoot catalyst 42, which form an exhaust purifier that purifies hazardous components in the exhaust gas. The direct catalyst 41 and the underfoot catalyst 42 each include a cylindrical case, and a three-way catalyst (catalyst) disposed in a channel inside the case and having three-way purification capability.

Figure 4:
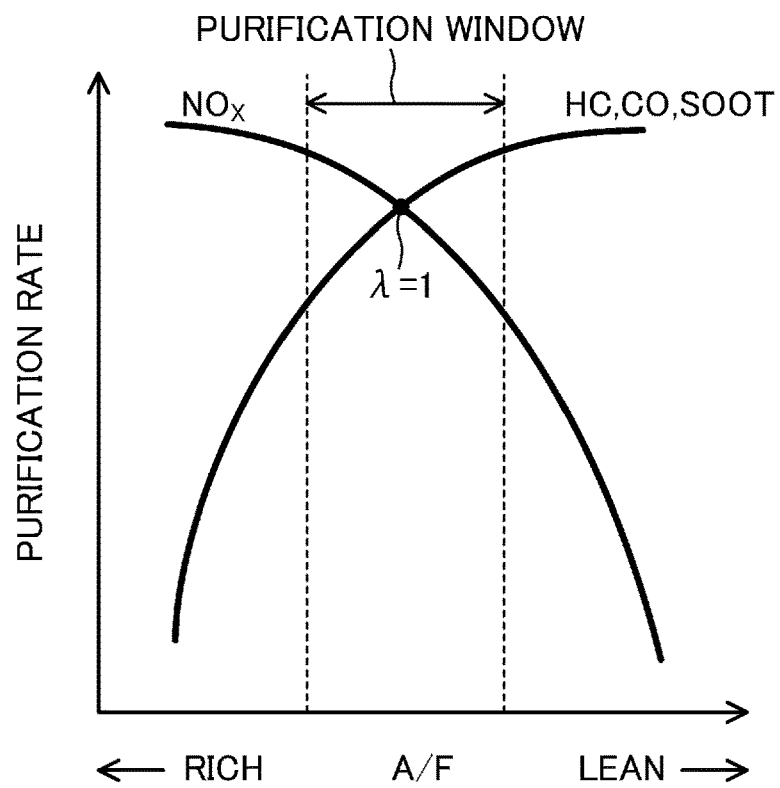
FIG. 4 is a graph showing the HC, CO, soot, and $NO_x$ purification rates of a three-way catalyst.

FIG. 4 is a graph showing the HC, CO, soot, and NO purification rates of the three-way catalyst. The three-way catalyst is configured to purify hydrocarbon (HC), carbon monoxide (CO), soot, and nitrogen oxide ($NO_x$) in the exhaust gas at temperatures higher than or equal to a predetermined temperature to purify these components. Specifically, the three-way catalyst includes a catalytic layer formed in the cylindrical case. The catalytic layer contains precious metal particles, such as platinum or palladium. As shown in FIG. 4, as the air-fuel ratio (A/F) in exhaust gas becomes leaner, the purification rates of reducing components such as HC and CO increase. On the other hand, as the air-fuel ratio A/F becomes richer, the purification rate of NO increases. While the air-fuel ratio A/F in the exhaust gas is within a predetermined purification window including a theoretical air-fuel ratio, the three-way catalyst can function to purify both reducing components and NOR, and can effectively demonstrate its three-way purification capability.

The intake passage 30 is connected to a purge system 80, which is configured to introduce fuel evaporated in the fuel tank 60 through the intake passage 30 into the cylinders. Specifically, the purge system 80 includes a canister 81 absorbing, and collecting, the fuel evaporated in the fuel tank 60, a purge passage 82 connecting the canister 81 to the intake passage 30, and a purge control valve 86 provided in the purge passage 82. The purge system 80 is configured to supply purge gas, containing the evaporated fuel and air, through the purge passage 82 to the intake passage 30 (specifically, the surge tank 33 of the intake manifold 32). Supplying purge gas to the intake passage 30 may be hereinafter referred to simply as "purging."

The canister 81 houses therein activated charcoal, which absorbs fuel vapor such that the fuel vapor can be desorbed therefrom. The canister 81 is connected to a fuel vapor pipe 81a through which fuel vapor in the fuel tank 60 is introduced into the canister 81, an open-to-air pipe 81b through which the canister 81 is open to the air, and the purge passage 82. Although not shown, the open-to-air pipe 81b is provided with an air filter that filters the air flowing into the canister 81, and a valve that opens and closes the open-to-air pipe 81b. The valve opens when the evaporated fuel is purged.

In this embodiment, the purge passage 82 is a single passage. Specifically, the purge passage 82 includes an upstream portion 83 connected to the canister 81, and a downstream portion 85 connected to the surge tank 33. The upstream portion 83 is provided with the purge control valve 86. In this embodiment, the purge control valve 86 is an electronically controlled valve that opens and closes under a control signal from the PCM 100. The downstream portion 85 is provided with a check valve 85a that prevents backflow of intake air from the surge tank 33.

The engine 1 configured as above is controlled by a powertrain control module (hereinafter referred to as the "PCM") 100. The PCM 100 is configured as a microprocessor including a CPU, a memory, a counter/timer group, an interface, and a path connecting these units together. This PCM 100 constitutes a controller.

As shown in FIGS. 1 and 2, the PCM 100 receives detection signals from various sensors SW1-SW3 and SW5-SW16. The various sensors include the following sensors. Specifically, the sensors represent an airflow sensor SW1, an intake air temperature sensor SW2, a second intake air temperature sensor SW3, an intake port temperature sensor SW5, a cylinder pressure sensor SW6, an exhaust temperature sensor SW7, an exhaust pressure sensor SW8, a linear $O_2$ sensor SW9, a lambda $O_2$ sensor SW10, a water temperature sensor SW11, a crank angle sensor SW12, an accelerator position sensor SW13, intake- and exhaust-side cam angle sensors SW14 and SW15, and a fuel pressure sensor SW16. The airflow sensor SW1 and the intake air temperature sensor SW2 are located downstream of the air cleaner 31 to detect the flow rate and temperature of fresh air, respectively. The second intake air temperature sensor SW3 is disposed downstream of the intercooler/warmer 34 to detect the temperature of fresh air that has passed through the intercooler/warmer 34. The intake port temperature sensor SW5 is attached to the intake port 16 to detect the temperature of intake air immediately before the intake air flows into the cylinders 18. The cylinder pressure sensor SW6 is attached to the cylinder head 12 to detect the internal pressures of the cylinders 18. The exhaust temperature sensor SW7 and the exhaust pressure sensor SW8 are disposed on the exhaust passage 40 to detect the temperature and pressure of the exhaust gas, respectively. The linear $O_2$ sensor SW9 is disposed upstream of the direct catalyst 41 to detect the oxygen concentration in the exhaust gas. The lambda $O_2$ sensor SW10 is disposed between the direct catalyst 41 and the underfoot catalyst 42 to detect the oxygen concentration in the exhaust gas. The water temperature sensor SW11 detects the temperature of an engine coolant. The crank angle sensor SW12 detects the rotation angle of the crankshaft 15. The accelerator position sensor SW13 detects the accelerator position corresponding to the degree to which an accelerator pedal (not shown) of a vehicle is depressed. The fuel pressure sensor SW16 is attached to the common rail 64 of the fuel supply system 62 to detect the pressure of fuel to be supplied to the injectors 67.

The PCM 100 performs various computations based on the detection signals to determine the state of the engine 1 or the vehicle. Accordingly, the PCM 100 outputs control signals to actuators of the injectors 67, the spark plugs 25, the intake valve drive mechanisms 71, the exhaust valve drive mechanisms 73, the fuel supply system 62, the purge system 80, and the various valves (the throttle valve 36 and the intercooler bypass valve 351). Driving the actuators allows the PCM 100 to operate the engine 1.

Figure 9:
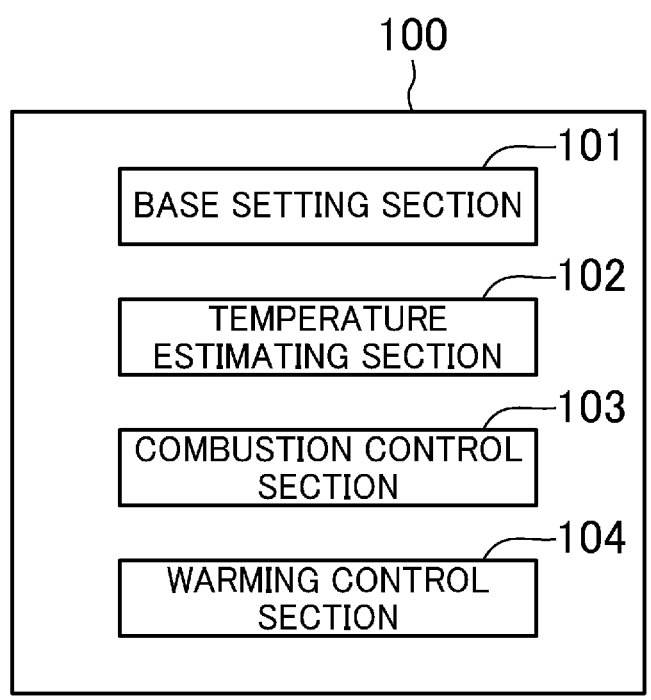
FIG. 9 shows a general configuration for a powertrain control module (PCM).

FIG. 9 shows a general configuration for the PCM 100. Specifically, the PCM 100 includes a base setting section 101, a temperature estimating section 102, a combustion control section 103, and a warming control section 104. The base setting section 101 sets basic values of the control signals to be output to the actuators. The temperature estimating section 102 estimates the catalyst temperature. The combustion control section 103 switches the operation of the engine 1 based on the operating conditions of the engine 1. The warming control section 104 warms the three-way catalyst via the combustion control section 103, based on the temperature estimated by the temperature estimating section 102.

The base setting section 101 reads the operating conditions of the engine 1 to determine a target acceleration corresponding to the conditions where the vehicle travels, the driver's operation, and other elements. Subsequently, the base setting section 101 determines a target value of torque (hereinafter referred to as the "target torque") based on the target acceleration, and sets the basic values of control parameters required to achieve the target torque (e.g., the degree of opening of the throttle valve 36, the time at which the spark plug 25 ignites the fuel, the opening and closing times of the intake valve 21 and the exhaust valve 22, and the amount of the fuel injected by the injectors 67) (torque-based control). The operating conditions of the engine 1 are read based on the results detected by the various sensors. Examples of the operating conditions include the engine speed, the vehicle speed, the accelerator position, and the gear position. The engine speed is obtained based on the result detected by the crank angle sensor SW12.

The temperature estimating section 102 obtains an estimated value Tc of the temperature of the three-way catalyst, based on the operating conditions of the engine 1 (specifically, the engine load) and the flow rate of exhaust gas. The flow rate of the exhaust gas is obtained based on the results detected by the exhaust temperature sensor SW7 and the exhaust pressure sensor SW8, the engine speed described above, and other parameters.

Figure 5:
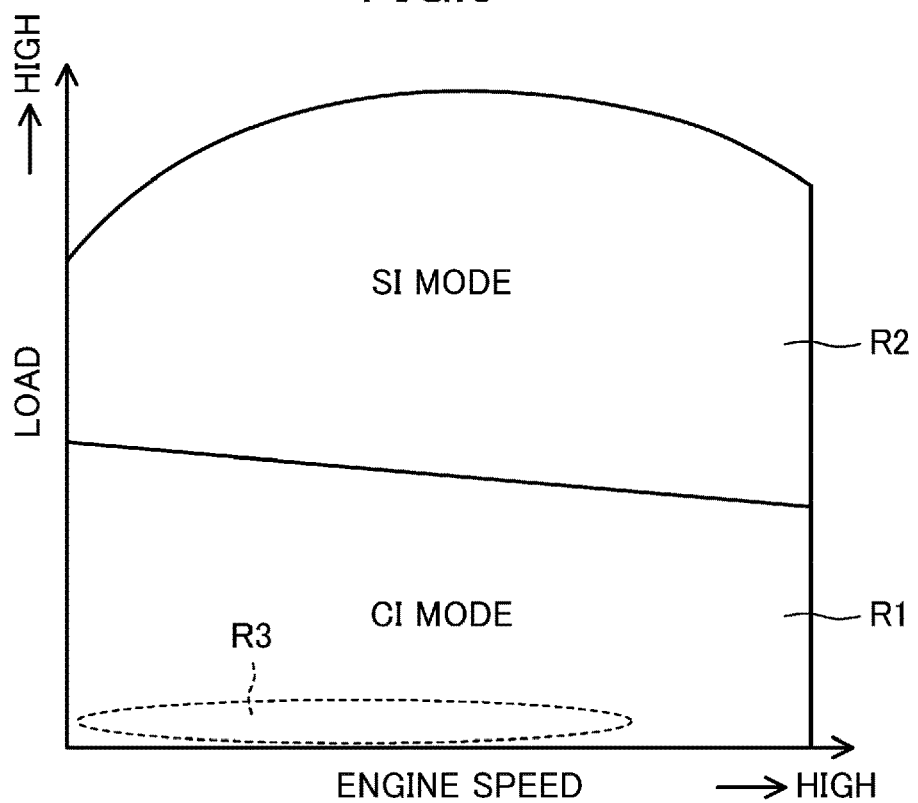
FIG. 5 exemplifies operating ranges of an engine.

FIG. 5 shows exemplary operating ranges of the engine 1.

The combustion control section 103 operates the engine 1 by compression ignition (CI) combustion of autoigniting the air-fuel mixture in the first through fourth cylinders 18a-18d, when the operating conditions of the engine 1 are in a predetermined low load range (hereinafter referred to as the "first range"). On the other hand, the combustion control section 103 actuates the spark plugs 25 to operate the engine 1 by spark ignition (SI) combustion of igniting the air-fuel mixture in the first through fourth cylinders 18a-18d, when the operating conditions of the engine 1 are in a second range R2 in which a load is higher than that in the first range.

Specifically, the engine 1 performs CI combustion by compression autoignition without igniting the air-fuel mixture with the spark plugs 25 in the first range R1 where the engine load is relatively low, in order to improve fuel efficiency and exhaust gas emission performance. However, as the load of the engine 1 increases, the compression ignition combustion becomes so rapid that it causes problems such as combustion noise. Thus, in the second range where the engine load is relatively high, the engine 1 stops the CI combustion, and starts the SI combustion with the spark plugs 25. As can be seen, the engine 1 is switched between a CI mode (first mode) in which the CI combustion is performed, and a SI mode (second mode) in which the Si combustion is performed, in accordance with the operating conditions of the engine 1, particularly in accordance with the load of the engine 1. However, the boundary between the modes should not be limited to what is shown in the figure.

The combustion control section 103 according to this embodiment is configured to be switchable between the CI combustion and the SI combustion on a cylinder-by-cylinder basis. More specifically, the combustion control section 103 can assign the first through fourth cylinders 18a-18d into CI and SI cylinders which perform CI combustion and SI combustion, respectively. For example, assigning the first and fourth cylinders 18a and 18d as the SI cylinders allows the air-fuel mixture in the first and fourth cylinders 18a and 18d to be set to undergo the SI combustion, whereas assigning the second and third cylinders 18b and 18c as the CI cylinders allows the air-fuel mixture in the second and third cylinders 18b and 18c to be set to undergo the CI combustion. The above-described CI mode is achieved if all of the first through fourth cylinders 18a-18d are assigned as CI cylinders. The above-described SI mode is achieved if all of the first through fourth cylinders 18a-18d are assigned as SI cylinders.

Figure 8:
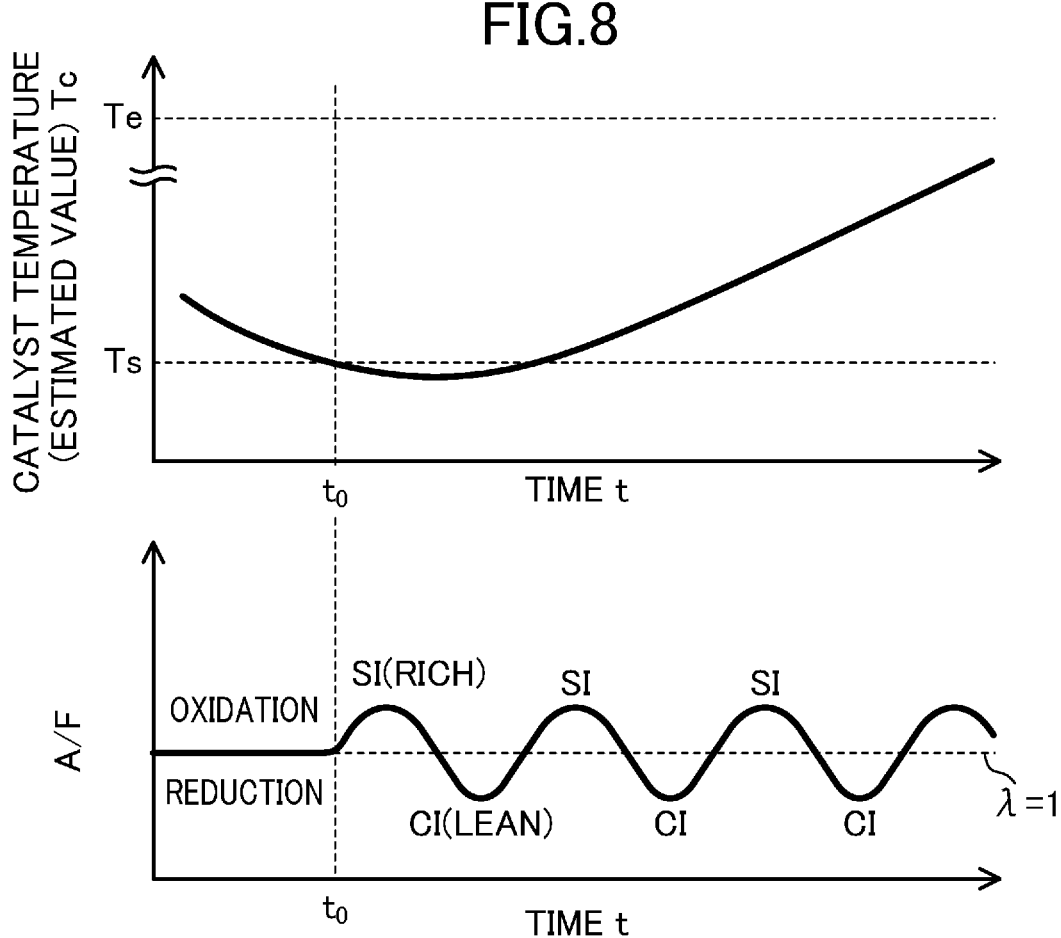
FIG. 8 is a time chart exemplifying a change in the catalyst temperature and a change in the air-fuel ratio during the first warming control.

The combustion control section 103 also warms the three-way catalyst based on the result estimated by the temperature estimating section 102. Here, the combustion control section 103 selects one of first warming control or second warming control in accordance with the internal temperatures of the combustion chambers. The first warming control is performed to reduce the degree to which the fuel efficiency decreases. The second warming control is performed while the first warming control cannot be performed. The first warming control and the second warming control are both performed while the engine 1 is operated in the CI mode. The first warming control is performed, for example, in a situation where in a low load range of the first range (see the range R3 shown in FIG. 5), operation in the CI mode has continued for a relatively long period of time, and consequently the catalyst temperature has decreased to a predetermined temperature (FIG. 8: t≤t0).

<Catalyst Warming>

Figure 6:
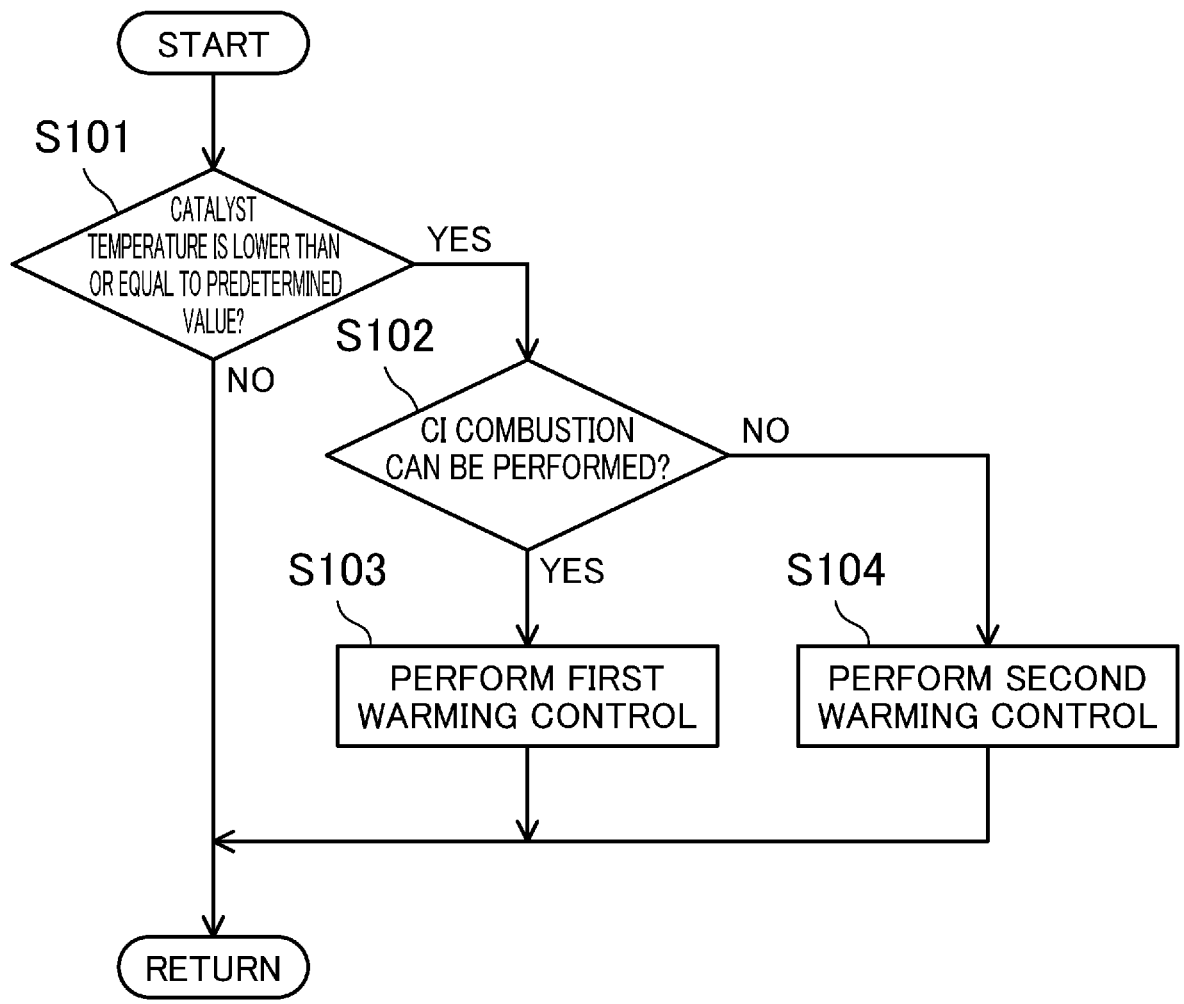
FIG. 6 is a flowchart of a process relating to how to use first warming control and second warming control differently.

The following description, which relates to, out of control operations performed by the PCM 100, a control operation performed by the warming control section 104 to warm the three-way catalyst, will be given with reference to FIGS. 6 and 8. FIG. 6 is a flowchart relating to how to select one of the first warming control or the second warming control. FIG. 8 is a time chart exemplifying a change in the catalyst temperature and a change in the air-fuel ratio A/F, which are caused by the first warming control.

First, in step S101, the warming control section 104 reads the estimated value Tc of the catalyst temperature obtained by the temperature estimating section 102. Subsequently, the warming control section 104 determines whether or not the estimated value Tc is lower than or equal to a predetermined warming start temperature Ts (a predetermined temperature). If a determination is made that the estimated value Tc is higher than the warming start temperature Ts (Tc>Ts)

(step S101: NO), the three-way catalyst is determined not to have to be warmed, and the process returns. The warming start temperature Ts is stored in the memory of the PCM 100 or any other element in advance. On the other hand, if, in step S101, a determination is made that the estimated value Tc is lower than or equal to the warming start temperature Ts (Tc≤Ts) (step S101: YES), the process proceeds to step S102 so that the warming control section 104 allows the three-way catalyst to be warmed.

In step S102, the warming control section 104 determines whether or not the CI combustion can be performed in each cylinder 18. This determination is made based on the internal temperature of the associated combustion chamber. The internal temperature of the associated combustion chamber is estimated based on the temperature of the engine coolant. Specifically, if the temperature of the engine coolant is higher than or equal to a predetermined temperature (e.g., 85° C.), the warming control section 104 determines that the internal temperature of the associated combustion chamber is high enough to permit the CI combustion. If the warming control section 104 determines that the CI combustion can be performed in each of the first through fourth cylinders 18a-18d (step S102: YES), the process proceeds to step S103 so that the first warming control is performed, and then the process returns. On the other hand, if the warming control section 104 determines that the CI combustion cannot be performed in each cylinder 18 (step S102: NO), the process proceeds to step S104 so that the second warming control is performed, and then the process returns.

In the example shown in FIG. 8, when the time t is equal to t0, the estimated value Tc of the catalyst temperature decreases to the warming start temperature Ts. As a result, the warming control section 104 starts warming the three-way catalyst. In this example, the first warming control is supposed to be performed.

In the first warming control, the warming control section 104 assigns the first through fourth cylinders 18a-18d into the CI and SI cylinders described above so that the first through fourth cylinders 18a-18d alternately perform the CI combustion and the SI combustion in accordance with the order of combustion of the cylinders. In other words, the warming control section 104 assigns each of the first through fourth cylinders 18a-18d as the CI or SI cylinder in the first warming control so that the CI combustion and the SI combustion are alternately performed on a cylinder-by-cylinder basis.

Figure 7:
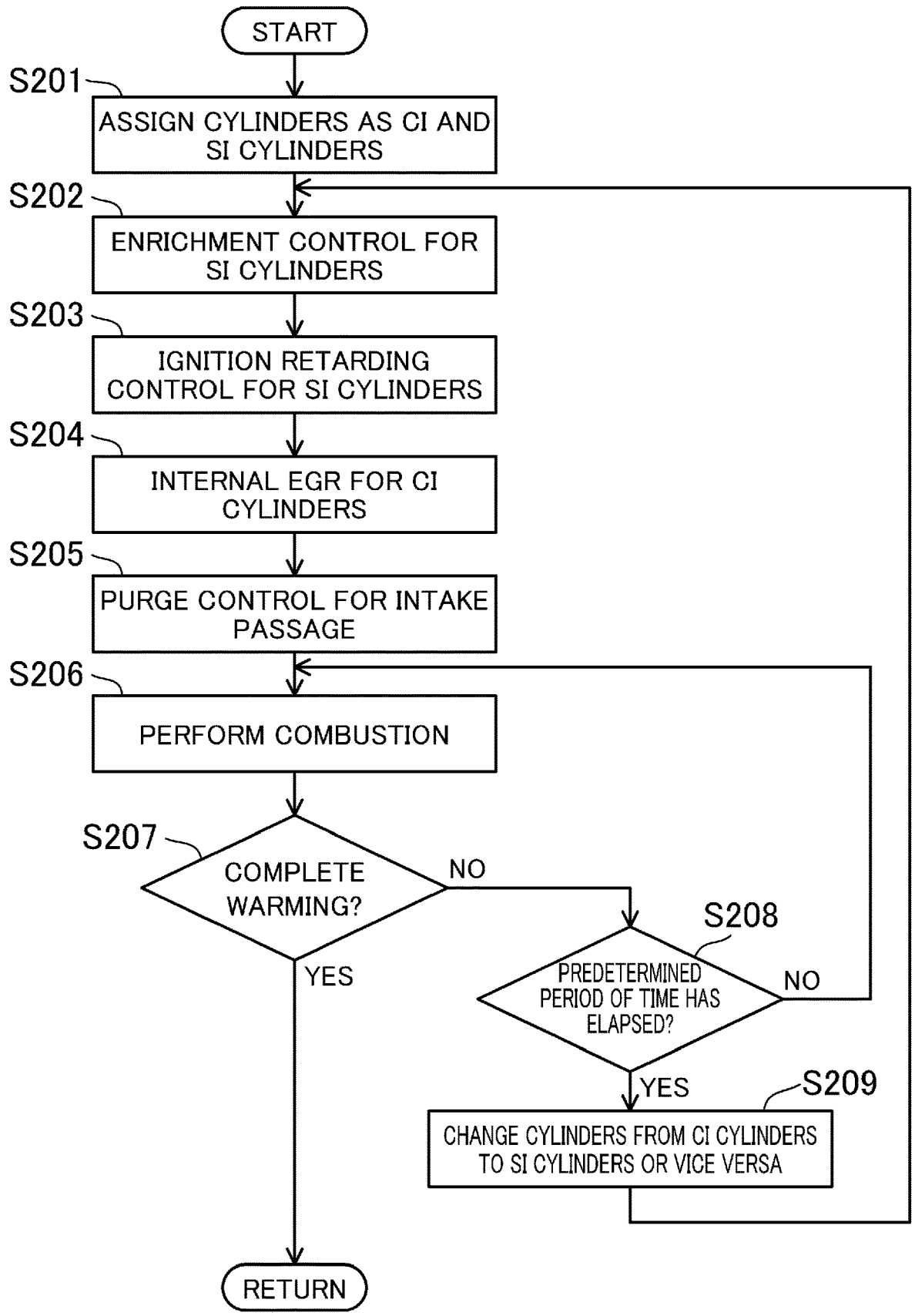
FIG. 7 is a flowchart relating to the first warming control.
Figure 10:
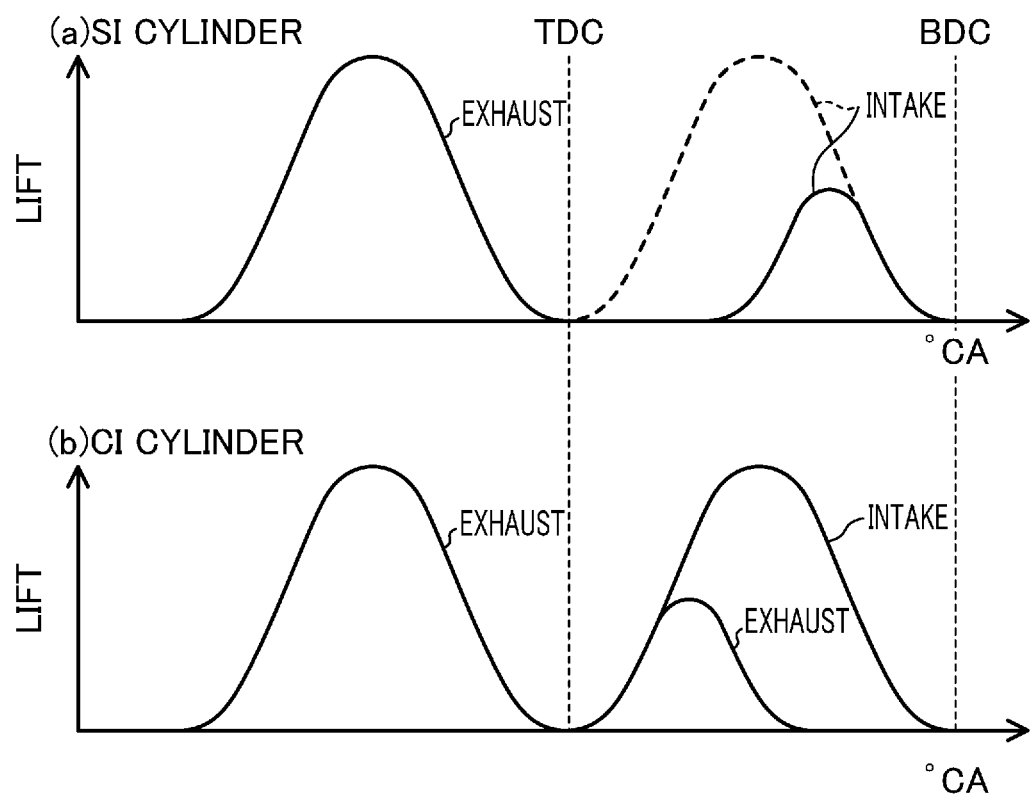
FIG. 10A is an explanatory graph showing the lift curves of an intake valve and an exhaust valve in an SI cylinder during the first warming control.
FIG. 10B is an explanatory graph showing the lift curves of an intake valve and an exhaust valve in a CI cylinder during the first warming control.

The following description, which relates to the first warming control, will be given with reference to FIGS. 7, 8, and 10. FIG. 7 is a flowchart of a process relating to the first warming control. FIG. 10A exemplifies the lift curves of the intake valve 21 and the exhaust valve 22 in each SI cylinder during the first warming control, and FIG. 10B exemplifies the lift curves of the intake valve 21 and the exhaust valve 22 in each CI cylinder during the first warming control.

(First Warming Control)

First, in step S201, the warming control section 104 assigns each of the cylinders as SI or CI cylinder via the combustion control section 103. In this embodiment, as described above, the air-fuel mixture is combusted in the order of the first cylinder 18a, the third cylinder 18c, the fourth cylinder 18d, and the second cylinder 18b during each of strokes. Thus, in this step, the warming control section 104 assigns the first and fourth cylinders 18a and 18d as CI cylinders and the third and second cylinders 18c and 18b as SI cylinders. Note that the first and fourth cylinders 18a and 18d may be assigned as SI cylinders, and the third and second cylinders 18c and 18b may be assigned as CI cylinders. If CI cylinders and SI cylinders coexist, i.e., if the CI combustion and the SI combustion are both performed, the throttle valve 36 are fully opened. This allows as large an amount of air as possible to be sucked into the CI cylinders. The amount of intake air to be supplied into the SI cylinders is adjusted through control over the intake valves 21 of the cylinders via the intake valve drive mechanisms 71.

In subsequent step S202, the warming control section 104 performs enrichment control in which the air-fuel ratio A/F in each SI cylinder is set to be richer than the theoretical air-fuel ratio ($\lambda$=1). More specifically, in the enrichment control, the warming control section 104 sets the air-fuel ratio A/F of the air-fuel mixture in each SI cylinder to be close to the theoretical air-fuel ratio and richer than the air-fuel ratio A/F of the air-fuel mixture in each CI cylinder and the theoretical air-fuel ratio. This setting is obtained if the amount of air to be sucked into the SI cylinder is reduced to an amount smaller than the amount of air to be sucked into the CI cylinder. If the SI and CI cylinders coexist as described above, the throttle valve 36 is fully opened. Thus, the amount of air to be sucked into each SI cylinder is adjusted through control over the intake valves 21 of the SI cylinders via the intake valve drive mechanisms 71. This adjustment is performed by matching the closing times of the intake valves 21 of the SI cylinders to those of the intake valves 21 of the CI cylinders and retarding the opening times of the intake valves 21 of the SI cylinders as shown in FIGS. 10A and 10B. Such adjustment shortens the opening periods of the intake valves 21 of the SI cylinders. Note that the amount by which the opening period is shortened is set so that the difference between the air-fuel ratio A/F in the SI cylinder and the theoretical air-fuel ratio (the amount by which the air-fuel ratio A/F in the SI cylinder is richer than the theoretical air-fuel ratio) is equal to the difference between the air-fuel ratio A/F in the CI cylinder, described below, and the theoretical air-fuel ratio (the amount by which the air-fuel ratio A/F in the CI cylinder is leaner than the theoretical air-fuel ratio), as shown in a lower portion of FIG. 8. In addition, the influence of the supply of purge gas, described below, on the setting is also taken into account. Since the SI and CI cylinders close at the same time, the effective compression ratios of the SI and CI cylinders are equal to each other.

At the same time as the enrichment control performed in step S202, the warming control section 104 controls each CI cylinder to set the air-fuel ratio A/F to be leaner than the theoretical air-fuel ratio. Specifically, the warming control section 104 controls the intake valves 21 of the CI cylinders via the intake valve drive mechanisms 71 to make the air-fuel mixture in the CI cylinders lean.

In subsequent step S203, the warming control section 104 performs ignition retarding control, which allows the timing at which the air-fuel mixture in each SI cylinder is ignited to be later than the timing at which an associated piston arrives at the compression top dead center.

In subsequent step S204, the warming control section 104 performs internal EGR for each CI cylinder. As described above, the internal EGR is performed by switching the operating mode of the exhaust valves 22 from the normal mode to the special mode via the exhaust valve drive mechanisms 73. As shown in FIG. 10B, the internal EGR causes the exhaust valves 22 of the CI cylinders to open twice. As a result, exhaust gas discharged from the interiors of the CI cylinders to the exhaust ports 17 is again sucked into the CI cylinders.

In subsequent step S205, the warming control section 104 performs purge control, which allows purge gas to be supplied via the purge system 80 to the intake passage 30. More specifically, in the purge control, the warming control section 104 opens the purge control valve 86 to supply purge gas in the canister 81 through the purge passage 82 to the intake manifold 32. The purge gas supplied to the intake manifold 32 is supplied into the cylinders together with the intake air that has passed through the throttle valve 36. The purge gas supplied improves the combustibility of the air-fuel mixture in the CI cylinders, and allows the air-fuel mixture in the SI cylinders to be richer. If fuel is not absorbed in the canister 81, the process proceeds to the next step without performing the purge control.

To perform steps S202-S205, the warming control section 104 controls the injectors 67, the spark plug 25, and other components to change the timing of fuel injection, the timing of ignition, and other elements, so that the difference between the torque obtained by the SI combustion performed in each SI cylinder and the torque obtained by the CI combustion performed in each CI cylinder is reduced, or more suitably, so that the difference becomes zero.

In subsequent step S207, the warming control section 104 combusts the air-fuel mixture in each of the SI and CI cylinders via the combustion control section 103. The thermal efficiency of the SI combustion, which is lower than that of the CI combustion, and the ignition retarding control performed in step S203 allow relatively high-temperature exhaust gas to be discharged from the SI cylinders. The enrichment control and purge control respectively performed in steps S202 and S205 allow the air-fuel ratio of the air-fuel mixture in each SI cylinder to be set to be rich. Thus, exhaust gas containing a relatively large amount of $NO_x$ is discharged from the SI cylinder. Such exhaust gas reaching the three-way catalyst relatively increases the number of reduction reactions of the exhaust gas in the catalyst as the $NO_x$ content in the exhaust gas increases. Thus, oxygen is occluded in the three-way catalyst (oxidation of the catalyst). Meanwhile, in the CI combustion, the air-fuel ratio of the air-fuel mixture is lean. Thus, exhaust gas containing a relatively large amount of reducing components, such as HC, CO, and soot, is discharged from the CI cylinders. Such exhaust gas reaching the three-way catalyst relatively increases the number of oxidation reactions of the exhaust gas in the catalyst as the content of the reducing components in the exhaust gas increases. Thus, oxygen is released from the three-way catalyst (reduction of the catalyst). The heat of reaction generated by an oxidation reaction of the reducing components is used to warm the three-way catalyst.

As can be seen, the high-temperature exhaust gas discharged from the SI cylinders and the heat of reaction generated by repeated oxidation-reduction reactions warm the three-way catalyst. This increases the temperature of the three-way catalyst (FIG. 8): t>t0).

As shown in FIG. 8, an oxidation reaction of the three-way catalyst caused by the exhaust gas from each SI cylinder and an oxidation reaction of the three-way catalyst caused by the exhaust gas from each CI cylinder are repeated. The SI cylinder combusts the air-fuel mixture having an air-fuel ratio set to be richer than the theoretical air-fuel ratio. The CI cylinder combusts the air-fuel mixture having an air-fuel ratio set to be leaner than the theoretical air-fuel ratio. The amount by which the air-fuel ratio A/F in the SI cylinder shifts and the amount by which the air-fuel ratio A/F in the CI cylinder shifts are set to be equal to each other under the enrichment control and the purge control both described above. Thus, the air-fuel ratio A/F in all of the first through fourth cylinders 18a-18d is close to the theoretical air-fuel ratio. Thus, purifying the three-way catalyst reduces the degree to which the exhaust gas emission performance deteriorates.

In subsequent step S207, the warming control section 104 determines whether or not the three-way catalyst has been warmed. To make this determination, the warming control section 104 reads the estimated value Tc of the catalyst temperature obtained by the temperature estimating section 102. This estimated value Tc reflects the influence of the first warming control on warming. The warming control section 104 determines whether or not the estimated value Tc is higher than or equal to a predetermined warming termination temperature Te. If the warming control section 104 determines that the estimated value Tc is higher than or equal to the warming termination temperature Te (Tc≥Te) (step S207: YES), the three-way catalyst is determined to have been warmed. Thus, the first warming control is terminated to return the operating mode of the engine to the CI mode, and the process then returns. The warming termination temperature Te is at least the temperature set to be higher than the warming start temperature Ts described above (Te>Ts), and is stored in the memory of the PCM 100 or any other component in advance. On the other hand, if a determination is made that the estimated value Tc is lower than the warming termination temperature Te (Tc<Te) (step S207: NO), the process proceeds to step S208 so that the warming control section 104 continues the first warming control. Setting the warming termination temperature Te at a temperature higher than the warming start temperature Ts as described above can substantially prevent the catalyst temperature from being lower than the warming start temperature Ts immediately after the start of the CI combustion in a situation where after termination of the first warming control, all of the cylinders perform the CI combustion. The above-described way of determining whether or not the catalyst has been warmed is merely an example. For example, the first warming control may be terminated based on the period of time that has elapsed since the first warming control was started.

In step S208, the warming control section 104 determines whether or not the same cylinder has been continually assigned as the SI cylinder or the CI cylinder for a predetermined or longer period of time. In this example, in step S201, the warming control section 104 makes this determination based on the period of time that has elapsed since the first and fourth cylinders 18a and 18d were assigned as the CI cylinders and the third and second cylinders 18c and 18b were assigned as the SI cylinder. If the warming control section 104 determines that the same cylinder has been assigned as the SI cylinder or the CI cylinder for a predetermined or longer period of time (step S208: YES), the process proceeds to step S209, in which each cylinder is changed from the SI cylinder to the CI cylinder or vice versa. Then, the process returns to step S202. On the other hand, if a determination is made that the first warming control has been performed for a period of time less than a predetermined period of time (step S208: NO), the process returns to step S206 without changing each cylinder from the SI cylinder to the CI cylinder or vice versa, and the first warming control is continued.

In step S209, the warming control section 104 changes each cylinder from the SI cylinder to the CI cylinder or vice versa. Specifically, the warming control section 104 changes the cylinders that have been assigned as the SI cylinders (i.e., the third and second cylinders 18c and 18b) to CI cylinders, while changing, to SI cylinders, the cylinders that have been assigned as the CI cylinders (i.e., the first and fourth cylinders 18a and 18d). After each cylinder has been changed from the SI cylinder to the CI cylinder or vice versa, the process returns to step S202. As described above, the warming control section 104 performs enrichment control for the SI cylinders (step S202), retards ignition (step S203), performs internal EGR for the CI cylinders (step S204), and supplies purge gas to the intake manifold 32 (step S205), in sequence. After these procedures have finished, the air-fuel mixture is combusted in each of the SI and CI cylinders via the combustion control section 103 (step S206).

(Second Warming Control)

On the other hand, in the second warming control performed if the internal temperatures of the combustion chambers are relatively low, the warming control section 104 operates the engine 1 in the SI mode, and retards the timing at which the air-fuel mixture is ignited. Specifically, unlike the first warming control, the warming control section 104 assigns all of the first through fourth cylinders 18a-18d as SI cylinders, and retards the timing at which the air-fuel mixture is ignited with respect to the timing corresponding to the operating conditions of the engine 1 by a predetermined amount. This allows a relatively high-temperature exhaust gas to be discharged from the cylinders.

<Summary>

As described above, according to the configuration, the PCM 100 performs the first warming control to alternately assign the first through fourth cylinders 18a-18d as CI and SI cylinders in accordance with the order of combustion of the cylinders. Thus, CI combustion and SI combustion are alternately performed on a cylinder-by-cylinder basis.

Since, in the SI combustion, exhaust gas has a relatively high temperature, exhaust gas discharged from the SI cylinders can warm the three-way catalyst. On the other hand, since, in the CI combustion, the thermal efficiency is relatively high, assigning one or more of the first through fourth cylinders 18a-18d as a CI cylinder or CI cylinders can reduce the degree to which the thermal efficiency of the entire engine 1 decreases and in turn, the degree to which the fuel efficiency decreases.

As can be seen, the configuration described above can reduce the degree to which the thermal efficiency of the entire engine 1 decreases while warming the three-way catalyst. This allows the three-way catalyst to be kept active, and can provide high fuel efficiency.

In addition, as described above, the first through fourth cylinders 18a-18d are alternately assigned as CI and SI cylinders in accordance with the order of combustion of the cylinders. As a result, the three-way catalyst repeatedly undergoes a reduction reaction and an oxidation reaction on a cylinder-by-cylinder basis. The resultant heat of reaction allows the three-way catalyst to be rapidly warmed.

According to the configuration described above, even if the air-fuel ratio A/F of each cylinder is set to be rich or lean, the total air-fuel ratio A/F in the first through fourth cylinders 18a-18d can be close to the theoretical air-fuel ratio. That is to say, although exhaust gas discharged from each cylinder contains a relatively large amount of $NO_x$ or reducing components, exhaust gas discharged from the first through fourth cylinders 18a-18d in total can contain $NO_x$ and reducing components in a balanced manner. Thus, the three-way catalyst can effectively demonstrate its three-way purification capability while repeatedly undergoing the reduction reaction and oxidation reaction described above.

If the SI combustion is performed, there arises the need to appropriately regulate the amount of air to be sucked into the cylinders in accordance with the output required of the engine 1 and other factors to provide high combustion stability. On the other hand, if the CI combustion is performed, combustion stability is high in spite of the lean air-fuel ratio of the air-fuel mixture. Thus, there is little need to regulate the amount of air to be sucked into the cylinders.

According to the configuration described above, while the first warming control is being performed, the PCM 100 fully opens the throttle valve 36. This allows as large an amount of air as possible to be sucked into the CI cylinders, in which CI combustion is performed. This improves the thermal efficiency. The PCM 100 controls the intake valves 21 via the intake valve drive mechanisms 71 to adjust the amount of air to be sucked into the SI cylinders. Thus, even if the throttle valve 36 is fully open, the amount of air to be sucked into the SI cylinders can be regulated, and in turn, SI combustion can be stably performed in the SI cylinders.

As can be seen, the configuration described above is effective at performing both CI combustion in the CI cylinders and SI combustion in the SI cylinders.

In addition, according to the configuration described above, the PCM 100 controls the intake valves 21 to reduce the amount of air to be sucked into the SI cylinders. This configuration allows the air-fuel ratio A/F of the air-fuel mixture in each SI cylinder to be set to be richer than the theoretical air-fuel ratio. In this case, the pumping loss does not increase.

According to the configuration described above, the PCM 100 changes the opening times of the intake valves 21 to reduce the amount of air to be sucked into the SI cylinders. Unlike a situation where the closing times of the intake valves 21 are changed, this configuration helps prevent the effective compression ratio of the piston 14 from decreasing and, in turn, maintain high thermal efficiency.

According to the configuration described above, the exhaust valve drive mechanisms 73 performs the subsequent valve opening operation, thus allowing the PCM 100 to again introduce part of the exhaust gas discharged to the exhaust ports 17 into the cylinders, i.e., to perform internal EGR. This helps increase the internal temperature of each CI cylinder and stabilize CI combustion.

As described above, in the SI combustion, the exhaust gas has a relatively high temperature. Thus, the internal temperature of each SI cylinder tends to be higher than that of each CI cylinder. To address this problem, according to the configuration described above, performing internal EGR allows the internal temperature of the CI cylinder to be kept higher in accordance with the amount of the exhaust gas again introduced. This can reduce the difference in temperature between the SI cylinder and the CI cylinder. This helps maintain uniform thermal deformation of the engine 1 to improve the reliability of the engine 1. In addition, reducing the difference in temperature between the cylinders helps stabilize CI combustion when the combustion mode returns to the CI mode after completion of the first warming control.

According to the configuration described above, if, under the first warming control, the same cylinder has been assigned as the SI or CI cylinder for a predetermined or longer period of time, the PCM 100 changes the cylinders from the SI cylinder(s) to the CI cylinder(s) or vice versa. Thus, while the internal temperature of the cylinder changed from the SI cylinder to the CI cylinder can be reduced, the internal temperature of the cylinder changed from the CI cylinder to the SI cylinder can be increased. This helps reduce the difference in temperature between the cylinders, and in turn, maintain uniform thermal deformation of the engine 1 to improve the reliability of the engine 1. In addition, as described above, the configuration described above helps stabilize CI combustion when the combustion mode returns to the CI mode after completion of the first warming control.

According to the configuration described above, the PCM 100 retards the timing at which the air-fuel mixture is ignited to lower the thermal efficiency of the SI cylinders. Accordingly, the temperature of the exhaust gas can be drastically increased. This allows the three-way catalyst to be rapidly warmed.

Evaporated fuel and air are mixed together in advance to obtain the purge gas. Supplying the purge gas can increase the combustibility of the air-fuel mixture in the CI cylinder. This helps reduce unburned fuel in each CI cylinder while the internal temperatures of the cylinders are relatively low, such as while the first warming control is being performed.

Supplying the purge gas allows the air-fuel ratio A/F of the air-fuel mixture in each SI cylinder to be set to be rich. This helps keep the three-way catalyst active and allow the three-way catalyst to effectively provide purification performance, as described above.

According to the configuration described above, the warming control section 104 performs the first warming control to reduce the difference between the torque obtained by the SI combustion and the torque obtained by the CI combustion, suitably to zero. This configuration allows the PCM 100 to reduce the degree to which the torque of the engine 1 varies.

According to the configuration described above, the warming control section 104 selects one of the first warming control or the second warming control based on whether or not the CI combustion can be performed. Such selection allows the three-way catalyst to be stably and reliably warmed.

Other Embodiments

The foregoing embodiment may also have the following structures.

In the foregoing embodiment, the order of steps S101-S104 and the order of steps S201-S209 are merely examples. The order of steps may be appropriately changed within a possible range, and a plurality of steps may be performed in parallel. For example, the procedure from step S202 to step S203 may be performed in parallel with step S204, and the order of these steps may be changed.

In the foregoing embodiment, the PCM 100 is configured such that the temperature estimating section 102 estimates the catalyst temperature. However, this configuration is merely an example. For example, a sensor provided near the three-way catalyst may sense the catalyst temperature.

In the foregoing embodiment, the engine 1 is configured as a four-cylinder gasoline engine. However, this configuration is merely an example. The engine 1 may be configured as a three-cylinder engine or an engine including five or more cylinders. If the engine is configured as a three-cylinder engine, two modes of control are alternately performed on a stroke-by-stroke basis. In one of the two modes, two of three cylinders are assigned as CI cylinders, and the other cylinder is assigned as an SI cylinder. In the other mode, one of the three cylinders is assigned as a CI cylinder, and the other two cylinders are assigned as SI cylinders. Alternately performing the modes of control eliminates the need for steps relating to change of each cylinder from a CI cylinder to an SI cylinder or vice versa, such as steps S208-S209 described above.

DESCRIPTION OF REFERENCE CHARACTERS

1 Engine (Engine Body)
16 Intake Port
17 Exhaust Port
18 Cylinder
18a First Cylinder
18b Second Cylinder
18c Third Cylinder
18d Fourth Cylinder
21 Intake Valve
22 Exhaust Valve
25 Spark Plug
30 Intake Passage
32 Intake Manifold
36 Throttle Valve
43 Three-Way Catalyst (Catalyst)
60 Fuel Tank
67 Injector (Fuel Injection Valve)
71 Intake Valve Drive Mechanism
73 Exhaust Valve Drive Mechanism
80 Purge System
81 Canister
82 Purge Passage
100 PCM (Controller)
Ts Warming Start Temperature (Predetermined Temperature)

The invention claimed is:

1. An engine control device comprising:
an engine including a plurality of cylinders;
fuel injection valves configured to supply fuel separately into the individual cylinders;
spark plugs attached to the cylinders, respectively, to each ignite an air-fuel mixture in an associated one of the cylinders;
a catalyst connected through an exhaust passage to the cylinders and functioning to purify exhaust gas discharged from each cylinder; and
a controller configured to control the fuel injection valves and the spark plugs to operate the engine, wherein
the controller selects one of a first mode, in which compression ignition combustion is used to autoignite the air-fuel mixture in the cylinders and thereby operate the engine, and a second mode, in which spark ignition combustion is used to ignite the air-fuel mixture in the cylinders and thereby operate the engine,
if a temperature of the catalyst is lower than or equal to a predetermined temperature while the engine body is being operated in the first mode, the controller performs warming control to assign each cylinder as either a combustion ignition (CI) cylinder or a spark ignition (SI) cylinder, where each CI cylinder performs the compression ignition combustion and each SI cylinder performs the spark ignition combustion, and
the cylinders alternately perform the compression ignition combustion and the spark ignition combustion in accordance with an order of combustion of the cylinders.

2. The engine control device of claim 1, wherein
under the warming control, the controller sets an air-fuel ratio of the air-fuel mixture in each SI cylinder to be richer than a theoretical air-fuel ratio while setting an air-fuel ratio of the air-fuel mixture in each CI cylinder to be leaner than the theoretical air-fuel ratio.

3. The engine control device of claim 2, wherein
the catalyst is configured as a three-way catalyst having three-way purification capability, and
under the warming control, the controller sets a difference between the air-fuel ratio of the air-fuel mixture in each SI cylinder and the theoretical air-fuel ratio to be equal to a difference between the air-fuel ratio of the air-fuel mixture in each CI cylinder and the theoretical air-fuel ratio.

4. The engine control device of claim 2, further comprising:
   inlets which communicate with the cylinders, respectively, and through each of which air is sucked from an intake passage common to the cylinders into an associated one of the cylinders;
   intake valves each capable of opening and closing an associated one of the inlets;
   a throttle valve provided in the intake passage to adjust a flow rate of gas to be supplied into the cylinders; and
   intake valve drive mechanisms configured to individually control opening times of the intake valves on a cylinder-by-cylinder basis, wherein
   under the warming control, the controller fully opens the throttle valve, and controls the intake valves of the cylinders via the intake valve drive mechanisms to allow an amount of air to be sucked into each SI cylinder to be lower than an amount of air to be sucked into each CI cylinder.

5. The engine control device of claim 4, wherein
   the intake valve drive mechanisms are configured to be able to individually change at least opening and closing times of the intake valves on a cylinder-by-cylinder basis, and
   under the warming control, the controller matches the closing times of the intake valves of the SI and CI cylinders to each other, and adjusts the opening time of the intake valve of each SI cylinder, via an associated one of the intake valve drive mechanisms, to reduce the amount of air to be sucked into each SI cylinder.

6. The engine control device of claim 1, further comprising:
   exhaust valves each capable of opening and closing an associated one of outlets through each of which gas is discharged from inside of an associated one of the cylinders to the exhaust passage; and
   exhaust valve drive mechanisms configured to individually control opening and closing of the exhaust valves on a cylinder-by-cylinder basis, wherein
   the exhaust valve drive mechanisms are configured to be able to open and close the exhaust valves such that subsequent to a main valve opening operation performed during an exhaust stroke, a subsequent valve opening operation is performed to allow the exhaust valves to be open during an intake stroke, and
   under the warming control, the controller controls the exhaust valves via the exhaust valve drive mechanisms to allow the main valve opening operation and the subsequent valve opening operation to be performed for the exhaust valve of each CI cylinder.

7. The engine control device of claim 1, wherein
   if an identical cylinder has been assigned as the SI cylinder or the CI cylinder for a predetermined period of time by the warming control, the controller changes at least one of the cylinders that has been assigned as the SI cylinder to the CI cylinder while changing the other cylinder that has been assigned as the CI cylinder to the SI cylinder.

8. The engine control device of claim 1, wherein
   under the warming control, the controller allows a timing at which the air-fuel mixture in each SI cylinder is ignited to be later than a timing at which an associated piston arrives at a compression top dead center.

9. The engine control device of claim 1, further comprising:
   a purge system configured to introduce evaporated fuel in a fuel tank into the cylinders, wherein
   the controller performs the warming control such that the purge system supplies purge gas to the cylinders.

10. The engine control device of claim 1, wherein
    the controller performs the warming control such that a torque obtained by the spark ignition combustion in each SI cylinder is equal to a torque obtained by the compression ignition combustion in each CI cylinder.

* * * * *